(12) United States Patent
Stone et al.

(10) Patent No.: US 6,557,825 B2
(45) Date of Patent: May 6, 2003

(54) AIR ADMITTANCE VALVE CONNECTOR ASSEMBLY

(75) Inventors: Richard T. Stone, Minneapolis, MN (US); Raun A. Kopp, Brunswick, OH (US)

(73) Assignee: Cherne Industries Incorporated, Minneapolis, MN (US)

( * ) Notice: Subject to any disclaimer, the term of this patent is extended or adjusted under 35 U.S.C. 154(b) by 271 days.

(21) Appl. No.: 09/821,951

(22) Filed: Mar. 30, 2001

(65) Prior Publication Data

US 2002/0139952 A1 Oct. 3, 2002

(51) Int. Cl.[7] .................... F16L 29/00; F16K 51/00
(52) U.S. Cl. .................... 251/152; 277/607; 277/615; 285/232; 285/338
(58) Field of Search .................... 251/152, 148; 277/607, 615; 285/231, 232, 338

(56) References Cited

U.S. PATENT DOCUMENTS

| | | | |
|---|---|---|---|
| 3,494,504 A | | 2/1970 | Jackson |
| 3,913,928 A | * | 10/1975 | Yamaguchi ............... 277/209 |
| 3,923,081 A | * | 12/1975 | Persson ................... 137/217 |
| 4,232,706 A | | 11/1980 | Ericson |
| 4,318,547 A | | 3/1982 | Ericson |
| 4,440,406 A | | 4/1984 | Ericson |
| 4,506,705 A | | 3/1985 | Thompson |
| 4,768,560 A | | 9/1988 | Logsdon |
| 5,441,679 A | | 8/1995 | Chalich |
| 5,649,713 A | * | 7/1997 | Ledgerwood ............. 277/209 |
| 5,862,533 A | | 1/1999 | Johnson et al. |
| D421,792 S | | 3/2000 | Bevacco |
| 6,394,505 B1 | * | 5/2002 | Schmucki et al. ...... 277/607 X |

* cited by examiner

Primary Examiner—Kevin Lee
(74) Attorney, Agent, or Firm—Anthony G. Eggink

(57) ABSTRACT

A connector assembly for a plumbing appliance and for sealingly attaching an air admittance valve in a vent pipe. The connector assembly has an elastomeric sealing gasket with an interior threaded bore which is expanded by a rigid bottom portion of an air admittance valve. The bottom portion of the valve body has exterior threads and an expander portion which cooperates with the lower sealing ring of the sealing gasket to compress the elastomeric body of the sealing gasket against the interior of the vent pipe.

20 Claims, 2 Drawing Sheets

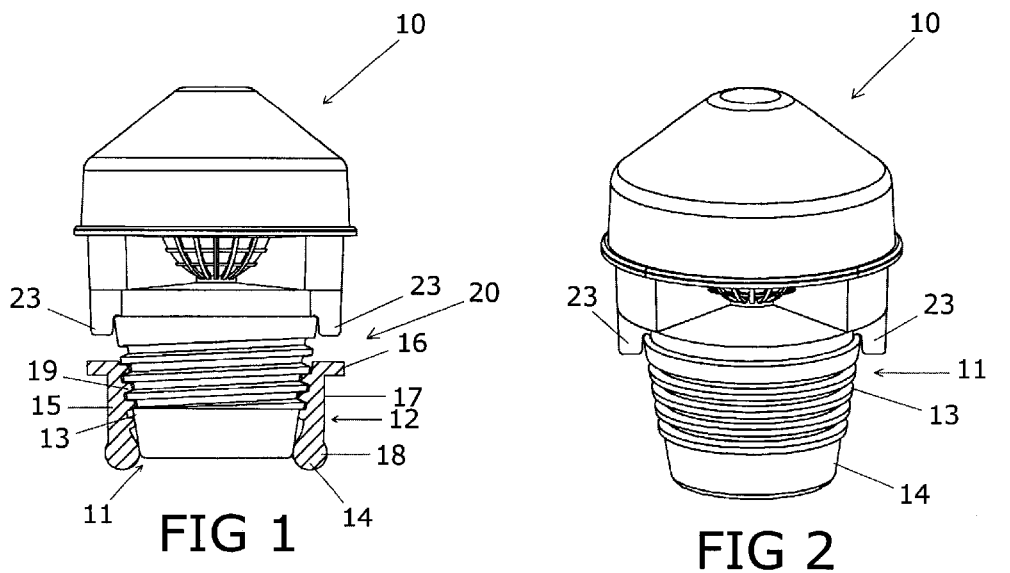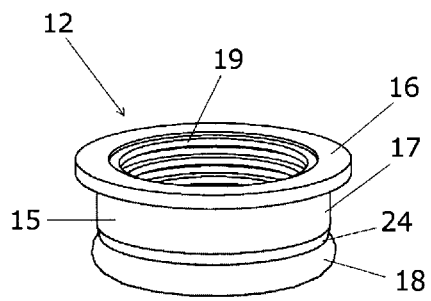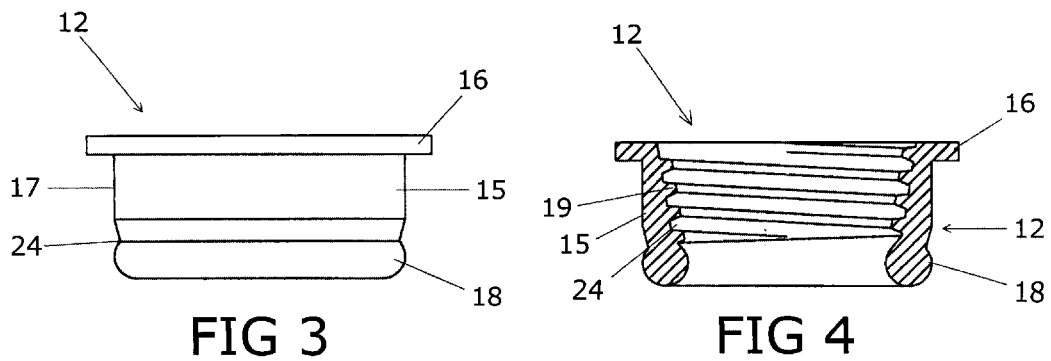

AIR ADMITTANCE VALVE CONNECTOR ASSEMBLY

BACKGROUND OF THE INVENTION

This invention relates generally to a gripping and sealing device for a pipeline and particularly to a connector assembly for sealingly holding a plumbing appliance in a pipe. Particularly, this invention relates to a device for the gripping and sealing engagement with the interior of a pipeline. More particularly, this invention relates to an air admittance valve connector assembly for sealingly positioning the valve body in a vent pipe, pipe fitting or like conduit structure.

In the past, various means have been proposed and utilized in the art to plug pipelines and to position and seal various types of plumbing appliances and devices in a pipe. For example, various pneumatic and mechanical means exist to plug pipes and to sealingly hold various plumbing products in a pipe. Further, threaded structures, adhesives and frictional means have been utilized and proposed to secure plumbing products to pipe ends. However, each securing means has its advantages and disadvantages. For example, the use of annular structures has been proposed to hold air admittance valves, however, these structures do not securely hold and seal the valves in the vent pipes. Other securing means are permanent, some are difficult and costly to produce and others are time consuming to install. The connector assembly of the present invention overcomes the difficulties and shortcomings of the prior art connecting devices.

The connector assembly of the present invention provides a versatile, easy to use assembly which secures a plumbing appliance in a pipe and which seals the appliance in the plumbing system. The connector assembly is well suited for use in the installation of air admittance valves in a plumbing vent system, however, the teachings of the invention are also applicable for use in plugging pipelines and for sealingly securing other plumbing devices in pipeline systems. For example, the connector assembly of this invention may be utilized in connection with an air admittance valve assembly as disclosed in Applicant's patent application entitled "Air Admittance Valve Assembly", Ser. No. 09/653,339, filed on Aug. 13, 2000, and which is incorporated by reference herein.

SUMMARY OF THE INVENTION

The present invention provides a pipeline gripping and sealing device and particularly a connector assembly for sealingly attaching an air admittance valve in a vent pipe. The connector assembly is comprised of a rigid bottom portion which may extend from the bottom of an air admittance valve body, for example, and which cooperates with an elastomeric sealing gasket which is adapted to be positioned in a vent pipe and to receive the rigid bottom portion of the valve body. Generally, the connector assembly of the invention provides a two-piece structure to grip and seal a plumbing device in a pipeline.

The elastomeric sealing gasket has a tapered interior threaded bore and further has an upper lip, an intermediate circumferential retention area and a lower sealing ring portion. The rigid bottom portion of the valve body, for example, is of a truncated conical configuration having an exterior threaded surface and a thickened bottom expansion area. The exterior threaded surface of the valve body is constructed and arranged to generally match the threads and to cooperate with the tapered interior threaded bore of the sealing gasket.

In use, the elastomeric sealing gasket is positioned into the top end of a vent pipe whereby the lip of the sealing gasket rests on the pipe end. The rigid bottom portion of the valve body is threaded into the internal threaded bore of the gasket causing the intermediate retention area of the elastomeric gasket body to engage and grip the interior wall of the vent pipe. The bottom expansion area of the valve body bottom engages and expands the lower sealing ring area of the sealing gasket against the interior of the vent pipe to thereby secure and seal the air admittance valve in the vent pipe.

Further provided are valve body structures which limit the penetration of the valve body bottom into the sealing gasket as well as valve body and sealing gasket structures and material compositions which provide pipe plug devices and connector assemblies to enable the sealing and plugging of pipes and the sealing securement of air admittance valves in vent pipes.

These and other benefits of this invention will become clear from the following description by reference to the drawings.

BRIEF DESCRIPTION OF THE DRAWINGS

FIG. 1 is a lateral view, partially in section, of an air admittance valve assembly utilizing the connector assembly of the invention;

FIG. 2 is a perspective view showing an air admittance valve assembly having a valve body with a tapered and threaded bottom portion;

FIG. 3 is a side view of the elastomeric sealing gasket of the connector assembly of the invention;

FIG. 4 is a cross sectional view of the sealing gasket of FIG. 3;

FIG. 5 is a perspective view of the sealing gasket of FIG. 3;

DESCRIPTION OF THE PREFERRED EMBODIMENTS

Figure 6:
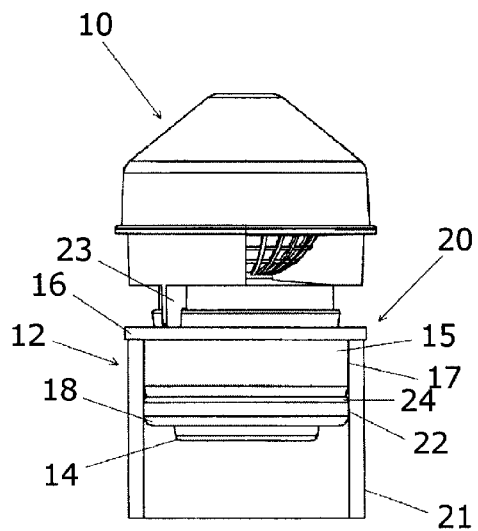
FIG. 6 is a lateral view of the air admittance valve connector assembly sealingly positioned in the end of a vent pipe.

The connector assembly of this invention is constructed and arranged to secure and seal a plumbing device in a pipe. For convenience, a pipe, vent pipe or pipeline will be referred to in this description, however, the assemblies of this invention may be installed into or onto pipe fittings and other conduit structures and the installation with respect to those structures are within the purview of this invention. The prior art generally teaches the use of devices which utilize the same elements to simultaneously secure and seal a plugging device in a pipe. For example, in mechanical plug devices, the exterior of the expanded surface both grips and seals the plug in a pipeline. Further, the threaded surfaces of the plug which are used to expand the flexible sealing member also are required to be in a sealing relationship to prevent leakage between the threads. Because of the dual purpose of the sealing surface of the expandable member and the sealing requirement of the threaded members, the configuration and composition of the elastomeric materials of the plug are often critical and the manufacturing tolerances of the threaded members are also critical. The connector assembly of the present invention overcomes the critical requirements and tolerances needed in prior art devices.

The prior art devices also produce stresses on the elastomeric gasket material and require precise thread patterns. For example, two piece plug devices have been proposed which require the gasket material and the inner rigid plug to have the same matching thread pattern to avoid leaks that may occur between the threads of the plug device. Further a large area of the exterior of the gasket material is required to both grip and seal the plug device against the interior of the pipeline. Other prior art devices utilize a push-in sealing structure to accommodate different valve diameters and which have been found to result in leaks and an insecure placement in a pipeline. The connector assembly of the present invention does not require a precise thread pattern and a seal is not required between the threads of the assembly components. The threads of the rigid threaded member initially expands and retains the sealing gasket in the pipe and subsequently seals the gasket in the pipe as well as the interior area of the assembly by means of the cooperation of the lower expansion area of the rigid member and the sealing ring area of the sealing gasket.

The relatively low contact pressure utilized in the assembly of this invention to expand the sealing gasket and the approximately 25% compression, for example, of the sealing ring area of the sealing gasket yields a low aspect ratio or relatively small strain on the elastomeric material composition of the sealing gasket to thereby maintain and maximize the integrity of the elastomeric composition.

The connector assembly of the invention comprises a two-piece structure, namely, a rigid body member and a cooperating flexible elastomeric sealing member. Each cooperating member is constructed and arranged whereby the assembly is independently secured and sealed in a pipe. The assembly may be utilized to plug and seal pipelines and may be used as part of a plumbing appliance, such as a connector assembly for an air admittance valve.

Referring to FIGS. 1–3, the connector assembly 20 of the invention is shown comprised of an air admittance valve assembly 10 and an elastomeric sealing gasket 12. The valve assembly 10 is shown to have a tapered bottom structure 11 having exterior threads 13 and a bottom expander portion 14. The tapered valve bottom 11 is shown to be unitary with the air admittance valve assembly 10 and is constructed and arranged to cooperate with the elastomeric sealing gasket 12. For example, the tapered valve bottom 11 may be secured by means of an adhesive to the bottom of the valve structure.

The valve assembly 10 is further shown to have a stop member 23 which limits the distance that the tapered rigid bottom 11 may be threaded into the elastomeric sealing gasket 12. The stop member 23 may be a continuous member having a downwardly disposed surface for engaging the top peripheral lip 16 of the sealing gasket 12. Alternatively, the stop member 23 may be comprised of several such members extending downward at the bottom of the valve periphery. As will be further described, the exterior threads 13 are utilized to expand the mid portion of the sealing gasket 12 for gripping securement purposes of the device and the bottom expander portion 14 of the valve bottom 11 is provided to seal the elastomeric gasket 12 in a pipe. The threads 13 and the tapered expander portion 14 draws the sealing ring portion 18 of the sealing gasket 12 onto the expander portion 14 of the rigid member.

Referring to FIGS. 4 and 5, the elastomeric sealing gasket 12 is shown to have a generally cylindrical body 15 having a top peripheral lip 16, an intermediate retention area 17 and a bottom sealing ring area 18. The sealing ring 18 is shown to have a round cross-section. The body member 15 has internally tapered threads 19 which are adapted to receive the external threads 13 of the tapered valve bottom 11.

FIG. 6 shows the air admittance valve 10 having the connector assembly 20 positioned in a vent pipe 21. As shown, the lip 16 of the elastomeric sealing gasket 12 engages the top end of the pipe 21. As the tapered valve bottom 11 is threaded into the sealing gasket 12, the elastomeric body is expanded outwardly to engage the interior wall of the pipe 21. As shown, retention area 17 provides a circumferential area which holds the valve assembly 10 in the pipe 21. Importantly, a circumferential seal 22 is shown which permits the valve assembly 10 to be sealingly held in the pipe 21. The latter is the result of the expander portion 14 of the tapered valve bottom 11 to engage and compress the sealing ring 18 of the sealing gasket 12. Although the connector assembly 20 is shown utilized on the inside of pipe 21, the teachings of this invention may also be used to provide an assembly which grips and seals the outside of a pipe, a fitting or the like.

The threads 13 of the tapered valve body 11 expand the outside of the elastomeric sealing gasket 12 to thereby cause the cooperating structure to be secured in the pipe. The expander portion 14 of the tapered valve body 11 specifically aligns to expand the sealing ring area 18 of the elastomeric sealing gasket 12 to thereby cause the cooperating structure to be secured and sealed in the pipe. For example, the sealing ring area 18 may be compressed in a range of 4–50% and is preferably compressed in a range of approximately 10–25% against the pipe interior wall. This compression arrangement provides for greater integrity of the elastomeric sealing gasket material. The relatively high contact pressure on a small portion of the O-ring 18 area results in a low total contact force by the outside sealing surface of the O-ring 18 against the interior of a vent pipe. The O-ring 18 provides a high integrity seal and the retention area 17 provides a large retention force for the assembly 20.

The elastomeric sealing gasket 12 may be constructed of any elastomeric composition such as neoprene, natural rubber, EPDM, nitrile rubber, SBR, Viton, urethane, flexible PVC, Santoprene, silicone or the like. The valve body bottom structure may be constructed of a rigid material, such as PVC, ABS, polystyrene, polypropylene, polyethylene or the like.

Figure 7:
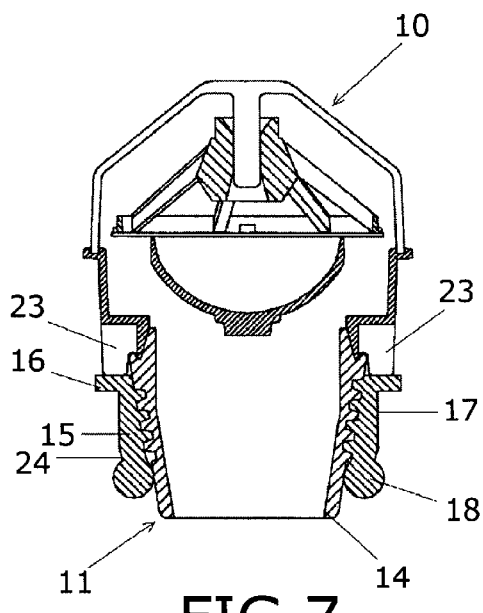
FIG. 7 is a sectional view of an air admittance valve assembly utilizing the connector assembly of the invention.

Referring to FIG. 7, the connector assembly 20 of this invention is comprised of an elastomeric sealing gasket 12 and an open, rigid and tapered structure 11 extending from the bottom of an air admittance valve 10. The rigid tapered structure 11 is shown attached on the bottom of the air admittance valve 10 and is comprised of an externally tapered threaded portion 13 and a bottom expansion portion 14. The sealing gasket 12 is comprised of a top lip 16, an internally tapered threaded portion 19 and a bottom sealing ring member 18. In use, the sealing gasket 12 is placed on the top of a vent pipe with the tapered rigid bottom member 11 of the air admittance valve 10 threaded into the matching internally tapered threads 19 of the sealing gasket 12. As the rigid bottom member 11 continues to be turned, the threaded portion 13 expands the retention area 17 against the interior of the pipe. Further, the tapered bottom expansion portion 14 of the rigid member 11 engages the sealing ring portion 18 of the elastomeric sealing gasket 12 and causes the sealing ring portion 18 to be pulled onto the tapered expansion portion 14 and thereby results in the outside of the sealing ring 18 to compress and seal against the interior of the pipe. In summary, the intermediate outer area 17 of the sealing gasket 12 grips and holds the valve body in the pipe end and the outer sealing ring 18 seals the valve structure 10 in the vent pipe.

Figure 8:
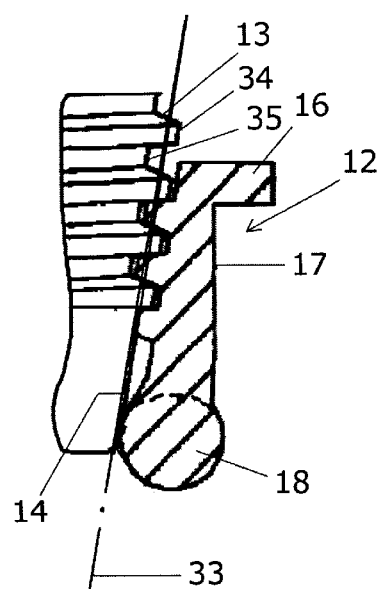
FIG. 8 is a sectional view showing the engagement between the expansion area of the rigid member and the sealing ring of the elastomeric gasket.

FIG. 8 particularly shows the cooperation between the rigid member and the sealing gasket of the invention. The rigid member is shown to have threads 13 and the adjoining lower expander portion 14 is shown aligned with axis 33. The elastomeric sealing gasket 12 is shown to have upper circumferential lip 16, outer wall or retention area 17 and the sealing ring 18 extending below circumferential indentation 24. The sealing ring 18 is shown to have a circular cross-sectional configuration which forms the bottom of the unitary sealing gasket 12. It is within the purview of this invention to utilize sealing ring 18 structures having other cross-sectional configurations such as quad rings, square rings, elliptical rings, and the like. The inner threads of the sealing gasket 12 are shown to generally match the thread pattern and acute angled slope of the rigid member. The acute angle of the tapered structures is defined with respect to a central axis extending through the assembly. The axis 33 is shown to extend generally between the outside 34 and the inside groove 35 of the thread design. Thus, as the rigid member is threaded into the sealing gasket 12, the expander portion 14 surface exerts an outward or radial force to the sealing ring 18 to thereby compress and seal the ring 18 to the expander portion 14 and the interior of a conduit for example. Simultaneously, the radial force exerted by the threads 13 of the rigid member to the threads and side wall of the elastomeric sealing gasket 12 causes the outside wall of the retention area 17 to be expanded against the interior of a conduit. In summary, the retention area 17 grips and holds the assembly with respect to the interior of the conduit, whereas the sealing ring 18 seals both the assembly with respect to the interior of the conduit and the sealing ring 18 with respect to the expander portion 14 of the rigid member. This dual and cooperating gripping and sealing function may be utilized in connection with various plumbing appliances. Further, this gripping and sealing function may be used on the outside of a pipe or fitting as discussed above.

Figure 9:
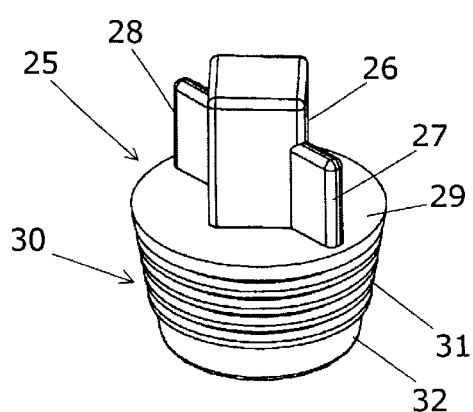
FIG. 9 is a perspective view of a rigid plugging member and showing the threaded conical structure and bottom expansion portion.

FIG. 9 shows a plug assembly 25 which is exemplary of a plumbing appliance which may be used in cooperation with the elastomeric sealing gasket 12. The tapered rigid bottom structure 30 is shown having exterior threads 31 and a lower expander portion, as previously described. Instead of a valve body structure, a top portion 29 having a turning structure comprised of an upwardly extending stud 26 and opposing wing members 27 and 28 are shown to form a unitary assembly for threading into sealing gasket 12. In use, by engaging the turning structure and turning the threads 31 into the tapered internally threaded bore of the sealing gasket 12, the plug assembly 25 provides a plug structure which may be easily utilized to grip and seal a pipe for plugging purposes. The plumbing appliance may have a closed top structure to form a plug device, may have a bore therethrough to provide fluid access through the top structure or the tapered valve bottom 11 and may have another plumbing appliance attached to the top portion so that the appliance may be sealingly secured with respect to a pipe.

As many changes are possible to the embodiments of this invention utilizing the teachings thereof, the descriptions above and the accompanying drawings should be interpreted in the illustrative and not in the limited sense.

That which is claimed is:

1. A connector assembly for sealingly attaching an air admittance valve to a vent pipe end comprising:
   a) an air admittance valve body having a rigid bottom portion with an open truncated conical configuration having an exterior wall having a threaded intermediate area and a generally smooth bottom peripheral area;
   b) an elastomeric sealing gasket having an upper lip, an intermediate exterior retention area and a lower sealing ring portion, said sealing gasket having a tapered interior bore having threads in an intermediate area above said lower sealing portion and whereby the placement and turning of said rigid bottom portion of said valve body into said elastomeric sealing gasket causes said intermediate exterior retention area of said sealing gasket to engage and grip the interior of the vent pipe and said bottom peripheral area to expand and seal said lower sealing ring portion of said sealing gasket against the interior of the vent pipe to thereby secure and seal said air admittance valve in the vent pipe.

2. The connector assembly of claim 1, wherein said rigid bottom portion of said valve body has at least one stop member positioned above said threads to thereby limit the penetration of the rigid bottom portion into the sealing gasket.

3. The connector assembly of claim 1, wherein said lower sealing ring portion of said elastomeric sealing gasket has a generally round cross section.

4. The connector assembly of claim 3, wherein said lower sealing ring portion is constructed and arranged to be compressed in a range of approximately 4–50% when said rigid bottom portion is fully threaded into said sealing gasket.

5. The connector assembly of claim 1, wherein said elastomeric sealing gasket is constructed of neoprene, natural rubber, EPDM or silicone.

6. The connector assembly of claim 1, wherein said rigid bottom portion of said air admittance valve is unitary with said valve body and constructed of a PVC, polystyrene, polypropylene, polyethylene or ABS composition.

7. A two piece connector assembly for the sealing connection to a pipe, comprising:
   a) a rigid body member having an upper portion and a lower portion, said upper portion being constructed and arranged for turning said rigid body member, said lower portion extending from said upper portion and having a generally frustoconical surface with a plurality of threads being of a predetermined configuration, said lower portion further having a thickened expander portion disposed below said threads;
   b) a flexible and cylindrical sealing elastomeric member having a conical bore, a height, a top, a bottom and an outside circumferential wall to engage and grip the interior of the pipe, said sealing member having a thickened sealing ring disposed on its bottom, said conical bore having a surface with a plurality of threads being of a generally matching configuration as said predetermined configuration of said plurality of threads of said lower portion of said rigid body member; and
   c) said frustoconical surface of said rigid body member and said surface of said conical bore of said sealing member each having a taper extending from top to bottom.

8. The connector assembly of claim 7, wherein a plumbing appliance is connected to said upper portion of said rigid body member.

9. The connector assembly of claim 8, wherein said plumbing appliance is selected from the group of appliances consisting of a top surface, a top surface having turning means and an air admittance valve.

10. The connector assembly of claim 7, wherein said sealing member has an upper peripheral lip.

11. The connector assembly of claim 7, wherein said lower portion of said rigid body member has at least one stop member positioned above said plurality of threads.

12. The connector assembly of claim 7, wherein said thickened sealing ring area of said elastomeric sealing member is comprised of a thickened circumferential area having a generally round cross section on said sealing member bottom.

13. The connector assembly of claim 12, wherein said thickened circumferential area is constructed and arranged to be compressed in a range of approximately 4–50% when said lower portion of said rigid body member is fully threaded into said sealing member.

14. The connector assembly of claim 7, wherein said elastomeric sealing member is constructed of neoprene, natural rubber, EPDM or silicone and wherein said rigid body member is constructed of a PVC, polystyrene, polypropylene, polyethylene or ABS composition.

15. A mechanical gripping and sealing assembly comprising:
    a) a rigid body member having a grasping portion, an intermediate threaded portion and a deforming portion, said intermediate threaded portion being generally of a conical configuration and having threads of a predetermined configuration extending therefrom; and
    b) a flexible sealing member being generally of a hollow cylindrical configuration and having a wall and a sealing ring area, said wall having a threaded pattern thereon, said threaded pattern having a thread configuration being generally the same as said predetermined thread configuration of said rigid body member whereby the turning engagement of said intermediate threaded portion of said rigid body member with said threaded pattern of said flexible sealing member causes said sealing member to deform to grip against a pipe and the engagement of said deforming portion of said rigid body member with said sealing ring area of said flexible sealing member causes said sealing ring area to deform and seal against the pipe.

16. The mechanical gripping and sealing assembly of claim 15, wherein said grasping portion is a plumbing appliance.

17. The mechanical gripping and sealing assembly of claim 16, wherein said plumbing appliance is selected from the group of appliances consisting of a top surface, a top surface having turning means and an air admittance valve.

18. The mechanical gripping and sealing assembly of claim 15, wherein said flexible sealing member has an upper peripheral lip and wherein said lower sealing ring area has a generally round cross sectional configuration.

19. The mechanical gripping and sealing assembly of claim 15, wherein said rigid body member has at least one stop member positioned above said threads and wherein said deforming area is a thickened circumferential area which aligns between the inner and outer portions of said threads.

20. The mechanical gripping and sealing assembly of claim 15, wherein said flexible sealing member is constructed of neoprene, natural rubber, EPDM, nitrile rubber, SBR, Vitron, urethane, flexible PVC, Santoprene or silicone and wherein said lower sealing ring area is constructed and arranged to be compressed in a range of approximately 4–50% when said deforming portion of said rigid body member is fully threaded into said flexible sealing member.

* * * * *

UNITED STATES PATENT AND TRADEMARK OFFICE
CERTIFICATE OF CORRECTION

PATENT NO.    : 6,557,825 B2
DATED         : May 6, 2003
INVENTOR(S)   : Richard T. Stone and Raun A. Kopp It is certified that error appears in the above-identified patent and that said Letters Patent is hereby corrected as shown below:

<u>Column 1,</u>
Line 43, delete '13" after the word "Aug." and insert -- 31 --

Signed and Sealed this

Ninth Day of September, 2003

JAMES E. ROGAN
*Director of the United States Patent and Trademark Office*